(12) United States Patent  (10) Patent No.: US 8,114,000 B2
Yasuda et al.  (45) Date of Patent: Feb. 14, 2012

(54) MACHINE TOOL WITH AUTOMATIC TOOL CHANGER

(75) Inventors: Hiroshi Yasuda, Nara (JP); Hiroto Matsushita, Nara (JP)

(73) Assignee: Mori Seiki Co., Ltd., Yamatokoriyama-shi (JP)

( * ) Notice: Subject to any disclaimer, the term of this patent is extended or adjusted under 35 U.S.C. 154(b) by 866 days.

(21) Appl. No.: 12/184,582

(22) Filed: Aug. 1, 2008

(65) Prior Publication Data

US 2009/0036282 A1 Feb. 5, 2009

(30) Foreign Application Priority Data

Aug. 4, 2007 (JP) ................................ 2007-203701

(51) Int. Cl.
*B23Q 3/157* (2006.01)
*B23Q 3/155* (2006.01)
*B23Q 11/08* (2006.01)

(52) U.S. Cl. .................... 483/3; 483/6; 483/11; 483/18; 483/26; 29/27 C; 700/179

(58) Field of Classification Search ........... 483/3, 4–11, 483/18, 17, 19, 22, 26, 44–46, 48–49, 51–53, 483/60–61; 29/27 C, 27 R; 700/179
See application file for complete search history.

(56) References Cited

U.S. PATENT DOCUMENTS

| | | | | |
|---|---|---|---|---|
| 3,775,837 A * | 12/1973 | Tomita et al. | ................... | 483/59 |
| 3,818,580 A * | 6/1974 | Pagella et al. | ..................... | 483/7 |
| 4,221,043 A * | 9/1980 | Dailey | ............................ | 483/44 |
| 4,729,159 A | 3/1988 | Henneberg | | |
| 4,752,885 A * | 6/1988 | Kawakami et al. | ........... | 700/179 |
| 4,998,196 A * | 3/1991 | Seki et al. | ........................ | 700/86 |
| 5,058,261 A * | 10/1991 | Kitamura | ........................ | 483/18 |
| 5,274,562 A * | 12/1993 | Suzuki | ......................... | 700/179 |
| 5,649,887 A * | 7/1997 | Taki et al. | ......................... | 483/3 |
| 6,077,206 A * | 6/2000 | Azema | .............................. | 483/3 |
| 6,352,496 B1 * | 3/2002 | Oldani | ............................ | 483/55 |
| 7,264,581 B1 | 9/2007 | Lai | | |
| 2008/0070767 A1 * | 3/2008 | Muser et al. | .................... | 483/59 |

FOREIGN PATENT DOCUMENTS

| EP | 0 234 639 A1 | 9/1987 |
|---|---|---|
| EP | 1 074 336 A2 | 2/2001 |
| JP | 59-227345 | 12/1984 |
| JP | 2-53542 | 2/1990 |

OTHER PUBLICATIONS

European Search Report dated Nov. 3, 2008.

* cited by examiner

*Primary Examiner* — Erica E Cadugan
(74) *Attorney, Agent, or Firm* — Kratz, Quintos & Hanson, LLP

(57) ABSTRACT

A tool changing unit moves between a magazine position and a changing position to transfer a tool. A machine tool has a plurality of tool changing positions. One of the tool changing positions is selected in advance for changing the tools next time. The tool changing unit and the tool mounted on a tool spindle move to the selected changing position for changing the tools in the selected changing position. Accordingly, the tool changing unit and the tool spindle move respective short distances for changing the tools, thereby shortening the non-machining time of a machine tool combined with the automatic tool changer.

8 Claims, 19 Drawing Sheets

MACHINE TOOL WITH AUTOMATIC TOOL CHANGER

BACKGROUND OF THE INVENTION

1. Field of the Invention

The present invention relates to a machine tool having a tool magazine and an automatic machine changer for changing a tool.

2. Description of the Related Art

Machine tools with an automatic tool changer (hereinafter also referred to as "ATC") are disclosed in U.S. Pat. No. 4,729,159 and Japanese laid-open patent publication No. 59-227345, for example.

The ATC disclosed in U.S. Pat. No. 4,729,159 includes a feeder for gripping and feeding a tool, which travels outside the machining area of the machine tool. The machine tool disclosed in Japanese laid-open patent publication No. 59-227345 includes a tool magazine for storing tools therein. The magazine itself is movable, and the ATC changes tools between the magazine and a tool rest.

The ATC disclosed in U.S. Pat. No. 4,729,159 has a predetermined tool changing position with respect to a tool rest. For changing tools, the tool rest has to move from a machining position to the tool changing position. As the tool rest needs to move a long distance to the tool changing position, it is time-consuming to replace the tool on the tool rest with another tool. Accordingly the machining tool has a long non-machining time.

If the ATC disclosed in U.S. Pat. No. 4,729,159 is incorporated in an elongate machine tool having a horizontally long machining area, the tool rest has to move a correspondingly long distance to the tool changing position. Therefore, there has been a demand for a technology for greatly reducing the time required to change tools.

In the machine tool disclosed in Japanese laid-open patent publication No. 59-227345, a movable unit including a tool magazine is heavy and cannot move at a high speed. Furthermore, a mechanism for moving the tool magazine is large and complex, imposing limitations on the number of tools that can be stored in the tool magazine.

Other ATCs according to the related art include a tool feeder disposed between a tool magazine and a tool changer arm. Tools are changed between the tool magazine and the tool changer arm via the tool feeder. However, these ATCs with the tool feeder are structurally complex in their entirety.

SUMMARY OF THE INVENTION

It is an object of the present invention to provide a machine tool having an automatic tool changer in which a tool changing unit and a tool spindle move reduced distances, respectively, for changing tools thereby to shorten the non-machining time of the machine tool.

In order to achieve the above object, in accordance with the present invention, there is a machine tool comprising an automatic tool changer having a movable tool changing unit for changing tools, a tool magazine for storing a plurality of tools, and a tool spindle for mounting a tool thereon and for machining a workpiece with the mounted tool; wherein the tool changing unit moves between a magazine position and a changing position to transfer the tool, changes the tools on the tool spindle in the changing position, and changes the tools on the tool magazine in the magazine position, wherein the machine tool has a plurality of changing positions; one of the changing positions is selected in advance for changing the tools next time; and the tool changing unit and the tool mounted on the tool spindle move to the selected changing position for changing the tools in the selected changing position.

According to the present invention, there is also provided a machine tool comprising an automatic tool changer having a movable tool changing unit for changing tools, a tool magazine for storing a plurality of tools, and a tool spindle for mounting a tool thereon and for machining a workpiece with the mounted tool; wherein the tool changing unit moves between a magazine position and a changing position to transfer the tool changes the tools on the tool spindle in the changing position, and changes the tools on the tool magazine in the magazine position, wherein the machine tool has a plurality of changing positions; one of the changing positions is selected in advance for changing the tools next time, and the tool changing unit is controlled to wait in one position, of waiting positions, which is close to the selected changing position; and when a tool change start signal is output, the tool spindle moves to cause the tool to reach the selected changing position, and the tool changing unit moves and changes the tools on the tool spindle in the selected changing position.

Preferably, the machine tool has a long machining area which is elongate in a horizontal direction; the horizontally long machining area is covered with a splash guard having a plurality of shutters corresponding to the changing positions, respectively; and the tool changing unit is disposed outside of the splash guard and is movable in the horizontal direction and is capable of waiting selectively in waiting positions near the shutters, respectively.

Preferably, the shutters are placed on a ceiling panel of the splash guard along the horizontal direction; and the tool changing unit is movable above the ceiling panel of the splash guard in the horizontal direction along the shutters.

Preferably, the tool changing unit comprises: a unit frame supported and guided by a traveling mechanism and actuated by a linearly driving servomotor to move in a displacing direction; a reciprocally movable member supported on the unit frame and actuated by a reciprocally driving servomotor to move reciprocally in a first direction perpendicular to the displacing direction; and an arm mounted on the reciprocally movable member and actuated to be swiveled by a swiveling servomotor, the arm having at least two tool grippers for detachably gripping the tool.

Preferably, the machine tool is capable of machining the workpiece which is elongate; and when the long workpiece is machined with the tool, the tool changing unit transfers and changes the tool for successively using the tools stored in the tool magazine.

Preferably, the machine tool comprises a multi-axis turning center including a headstock for rotatably supporting a workpiece spindle having a chuck for gripping the workpiece, and a tool rest having the tool spindle.

Preferably, the tool changed by the tool changing unit comprises a cutter detachably mounted on a distal end of a boring bar mounted on the tool spindle of the tool rest; and the tool rest moves to cause the cutter to reach to the selected changing position and the tool changing unit is controlled to change the cutter on the boring bar mounted on the tool spindle.

The machine tool having the automatic tool changer according to the present invention is constructed as described above. Since the tool changing unit and the tool mounted on the tool spindle move to a selected changing position, the distances which the tool changing unit and the tool spindle move for changing the tools are reduced thereby to shorten the non-machining time of the machine tool.

DESCRIPTION OF THE PREFERRED EMBODIMENT

Figure 1:
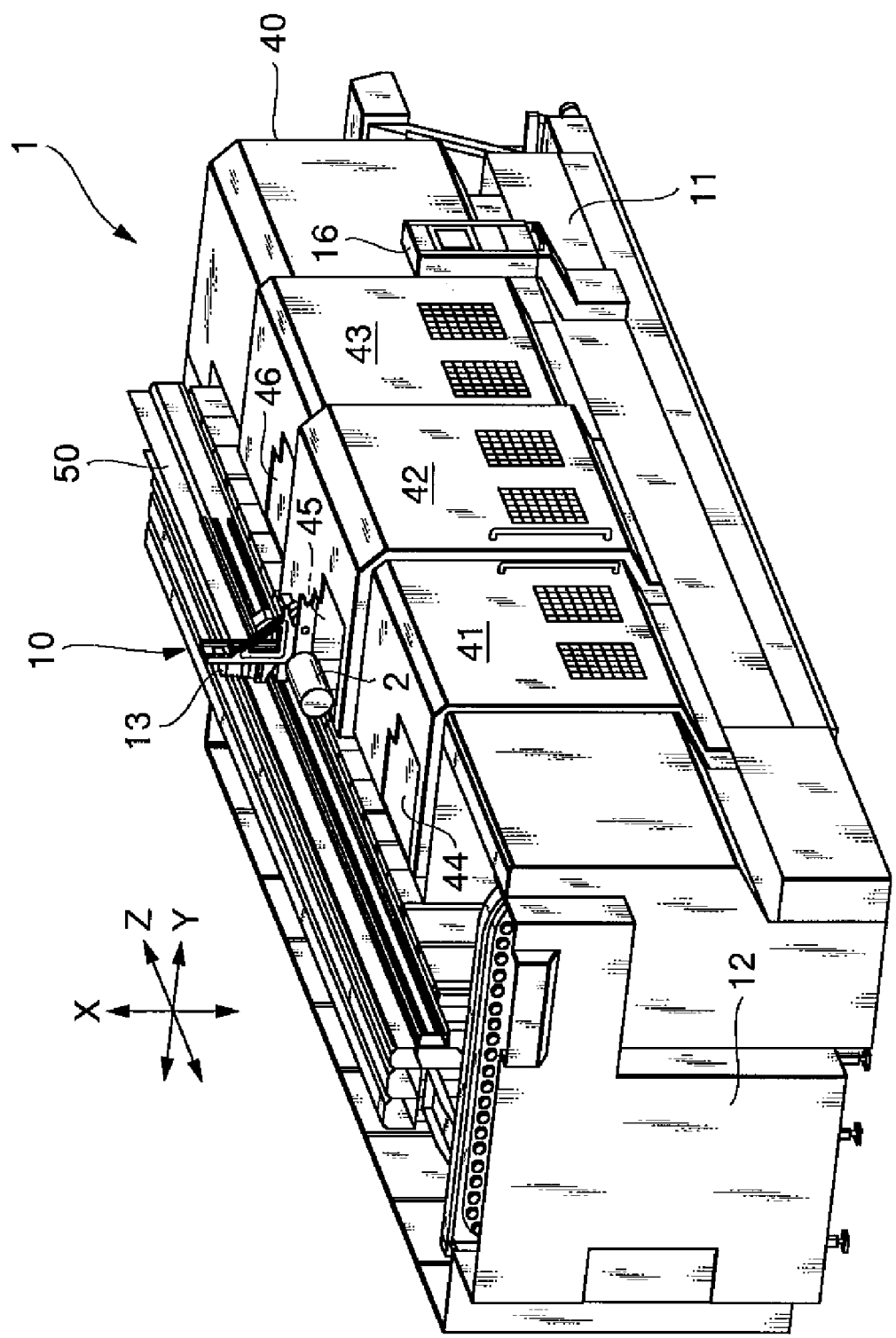
FIG. 1 is a perspective view of a machine tool according to the present invention.

Like or corresponding parts are denoted by like or corresponding reference characters throughout views.

A machine tool having an automatic tool changer according to the present invention comprises an automatic tool changer, a tool magazine for storing a plurality of tools, and a tool spindle for mounting a tool thereon and machining a workpiece with the tool. The automatic tool changer includes a movable tool changing unit (hereinafter referred to as "changing unit") for changing the tools.

The changing unit moves between a magazine position and a changing position, and transfers the tools in the magazine position and the changing position. In the changing position, the changing unit replaces the tool on the tool spindle with another tool. In the magazine position, the changing unit replaces the tool thereon with another tool from the magazine.

The machine tool has a plurality of changing positions. One of the changing positions is selected in advance for changing the tools next time. And then, the changing unit and the tool mounted on the tool spindle move to the selected changing position in which the changing unit replaces the tool on the tool spindle with another tool. Therefore, the changing unit and the tool spindle move relatively small distances, respectively for changing the tools, thereby shortening the non-machining time of the machine tool.

In a preferred embodiment of the present invention, the machine tool having the automatic tool changer comprises a multi-axis turning center. However, the machine tool may comprise a lathe having a tool spindle on a tool rest, a machining center having a tool spindle on a spindle head, a turning center or a grinding machine.

A machine tool having an automatic tool changer according to a preferred embodiment of the present invention will be described below with reference to FIGS. 1 through 19.

Figure 2:
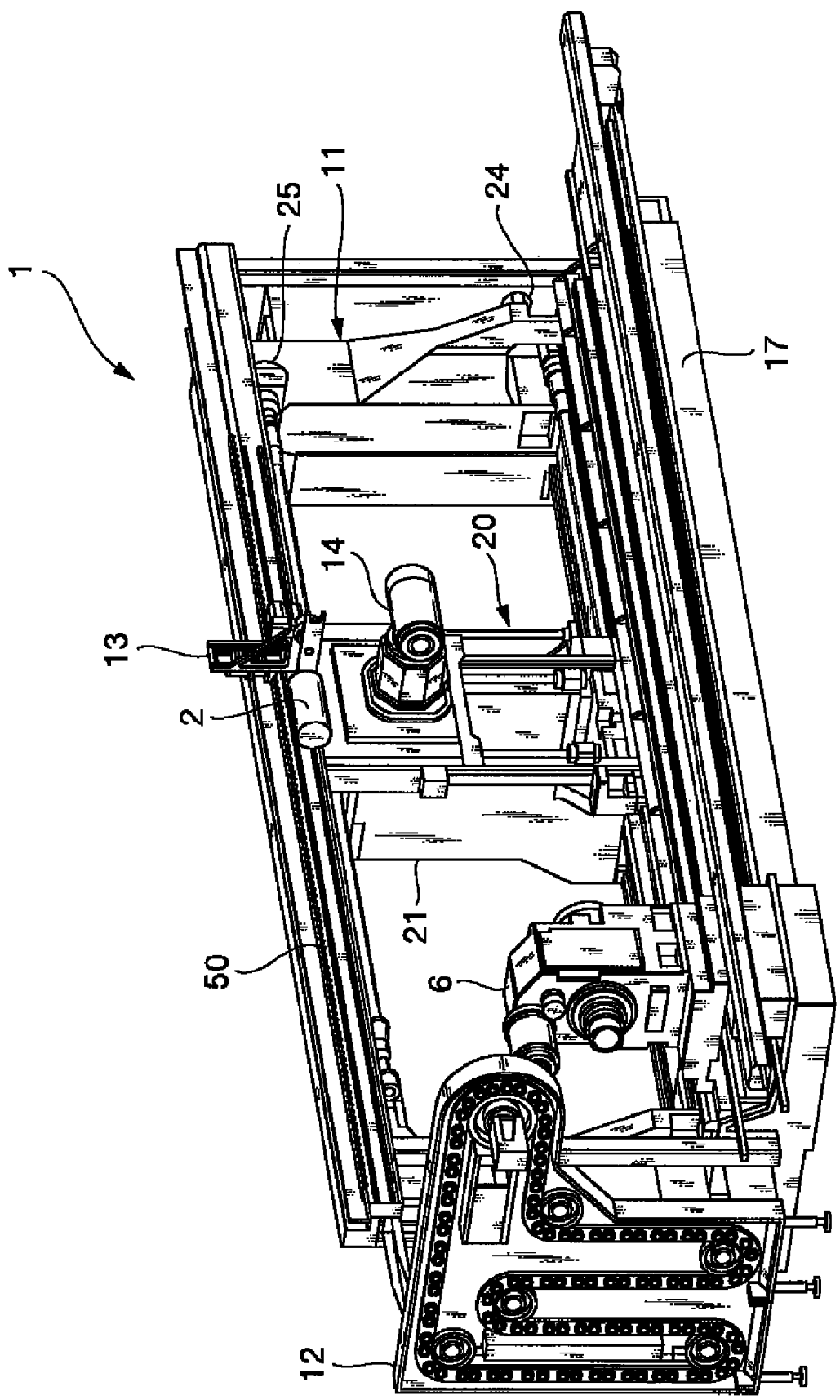
FIG. 2 is a perspective view showing structural details of the machine tool.
Figure 3:
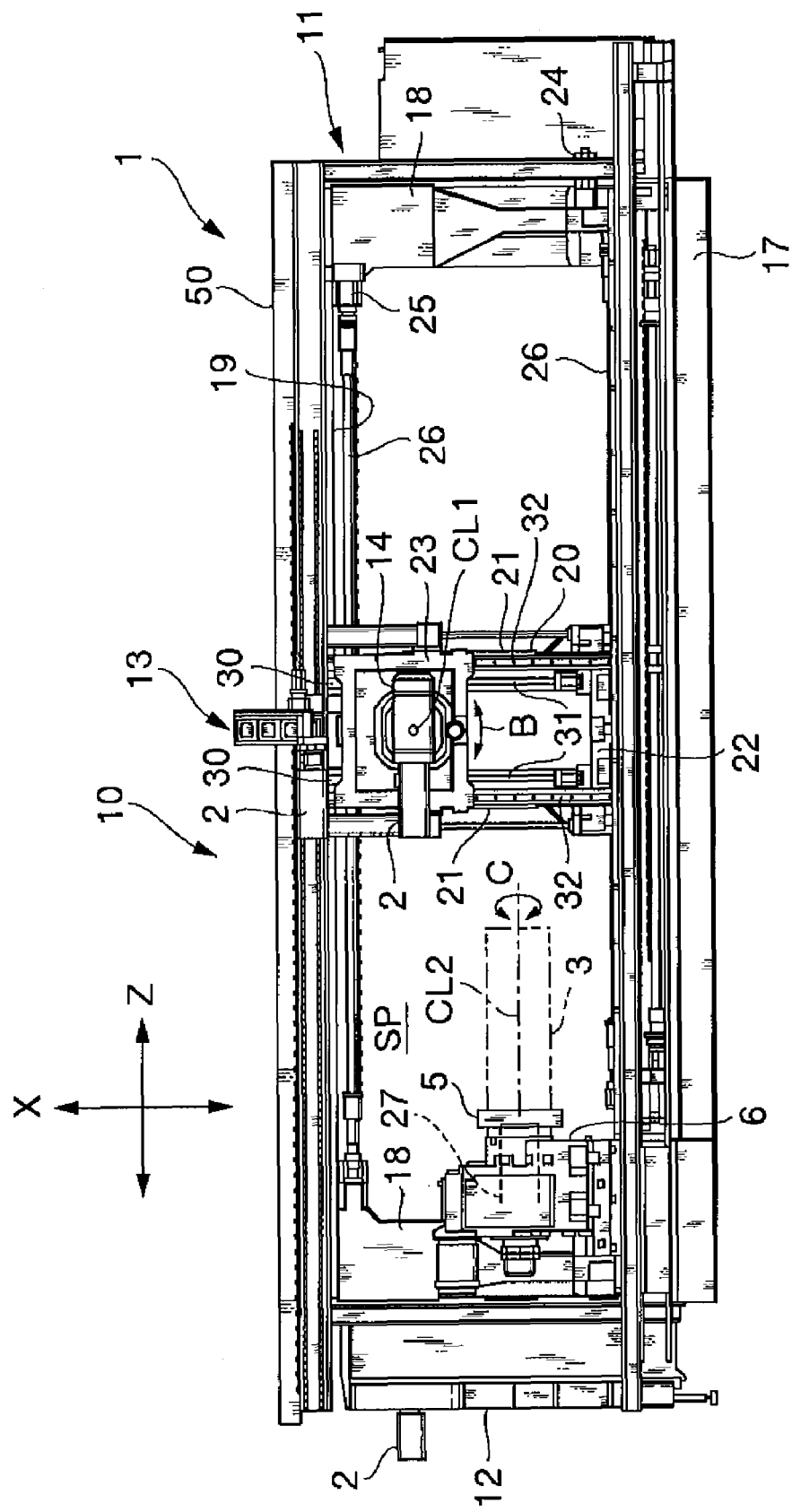
FIG. 3 is a front elevational view showing structural details of the machine tool.
Figure 4:
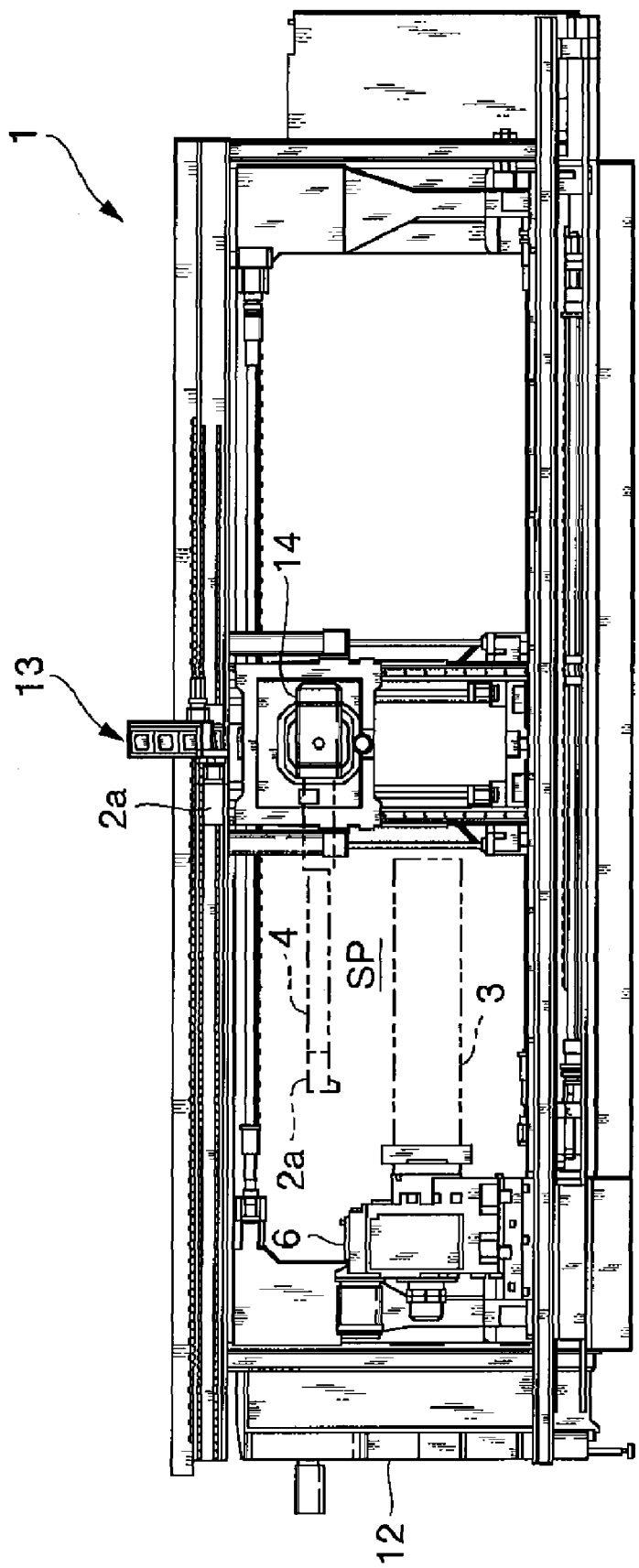
FIG. 4 is a front elevational view showing structural details of the machine tool at the time it employs a boring bar.
Figure 5:
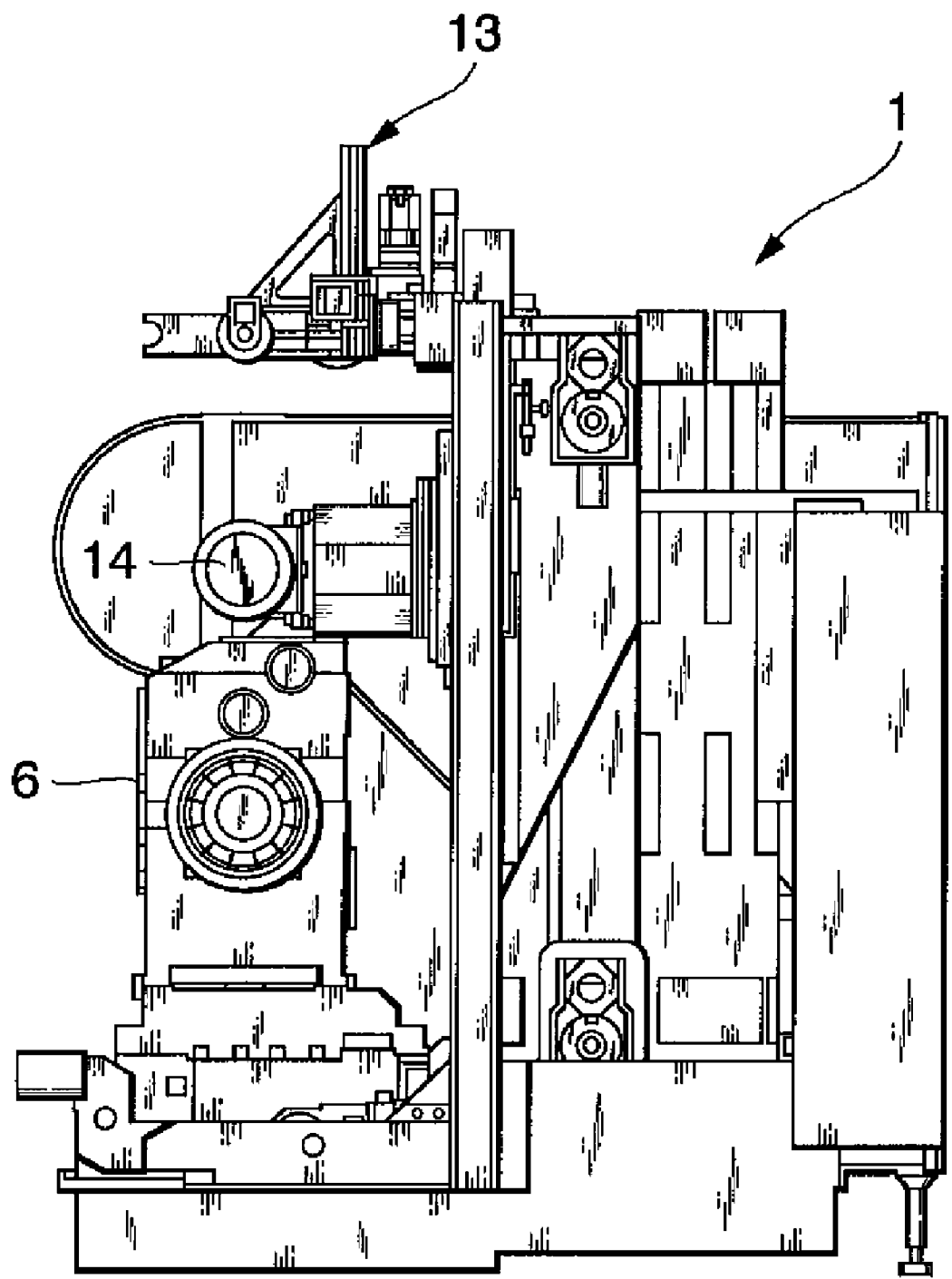
FIG. 5 is a side elevational view of the machine tool as from the right in FIG. 3.
Figure 6:
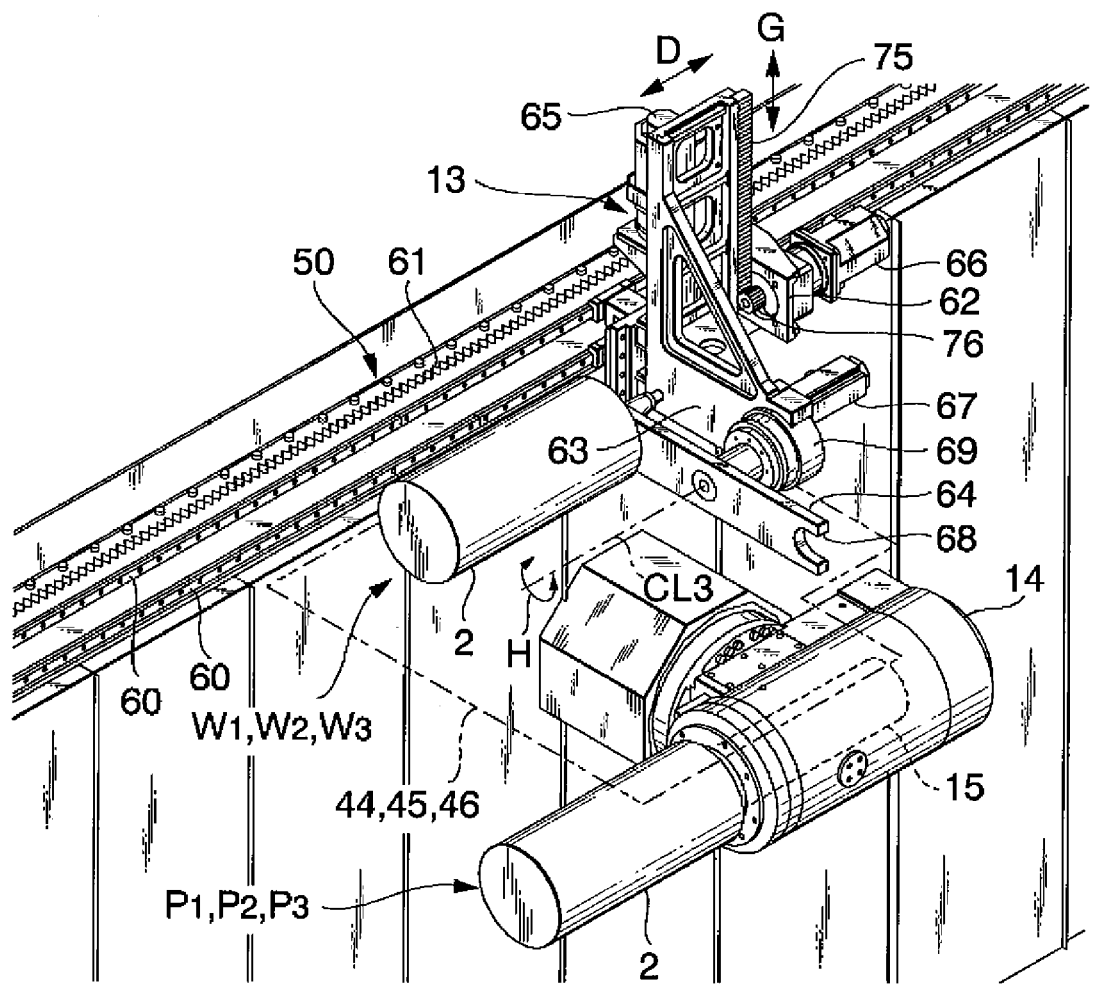
FIG. 6 is a fragmentary perspective view of an automatic tool changer of the machine tool.
Figure 7:
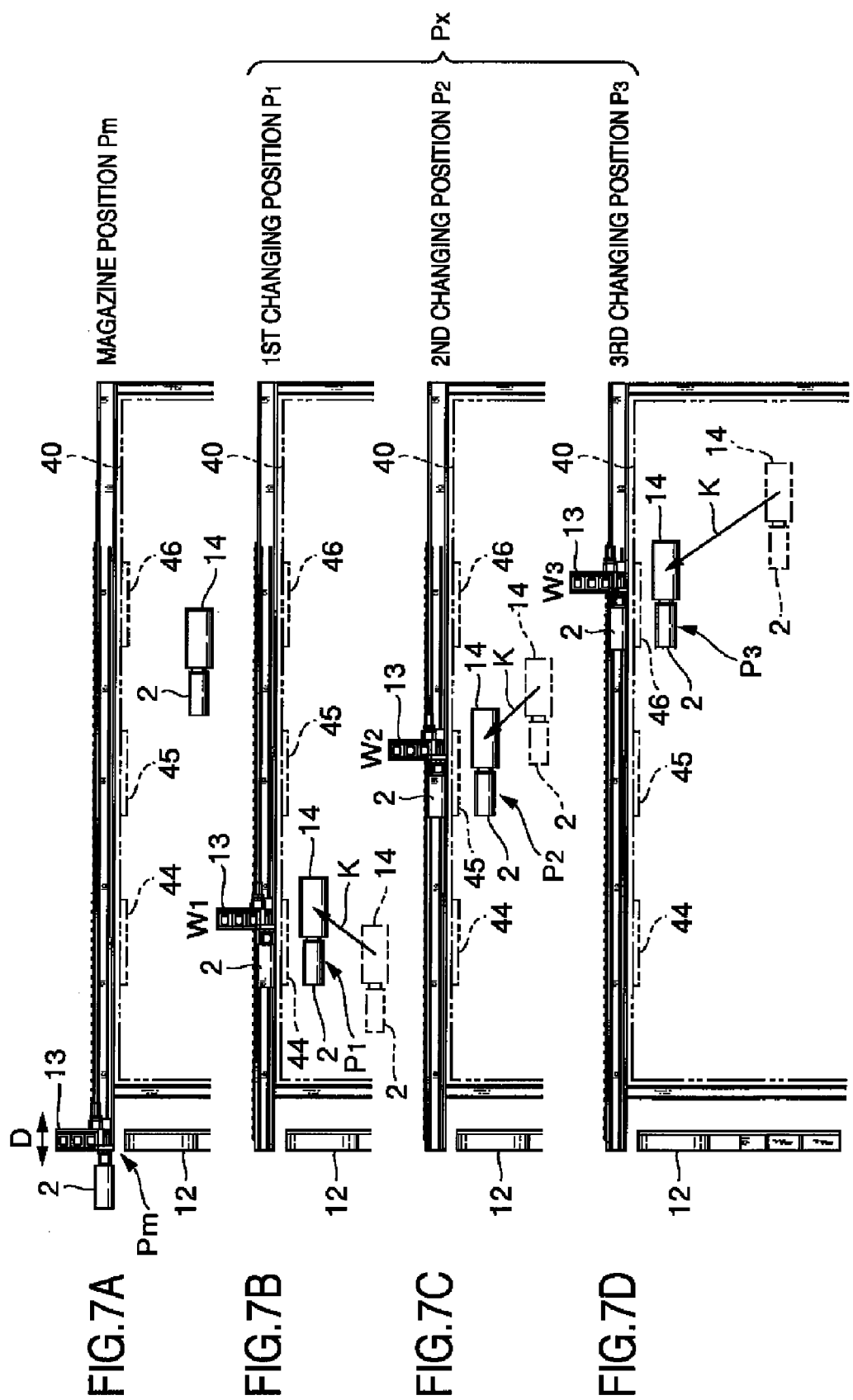
FIGS. 7A through 7D are schematic front elevational views illustrating a tool changing cycle.

FIG. 1 is a perspective view of the machine tool. FIGS. 2 and 3 are perspective and front elevational views, respectively showing structural details of the machine tool. FIG. 4 is a front elevational view showing structural details of the machine tool at the time it employs a boring bar. FIG. 5 is a side elevational view of the machine tool as from the right in FIG. 3. FIG. 6 is a fragmentary perspective view of an automatic tool changer of the machine tool. FIGS. 7A through 7D are schematic front elevational views illustrating a tool changing process.

As shown in FIGS. 1 through 6, FIGS. 7A through 7D, the machine tool 1 according to the present embodiment comprises a multi-axis turning center. The machine tool 1 includes a headstock 6, on which a workpiece spindle 27 having a chuck 5 for gripping a workpiece 3 is rotatably supported, and a tool rest 14 having a tool spindle 15.

The machine tool 1 functions as a lathe for turning the workpiece 3 with a tool 2 and also as a machining center for cutting the workpiece 3 with the tool 2. The machine tool 1 also functions as a boring machine for boring the workpiece 3 with a boring bar 4.

The tool 2 which is used by the machine tool 1 to turn or cut the workpiece 3 is changed by an ATC (Automatic Tool Changer) 10. The tool 2 is mounted on the tool spindle 15 on the tool rest 14 and machines the workpiece 3 which is gripped by the headstock 6.

The machine tool 1 comprises a machine body 11, the ATC 10 and a tool magazine 12. The ATC 10 has a movable tool changing unit (hereinafter referred to as "changing unit") 13 for changing the tools. The magazine 12 is capable of storing a plurality of tools 2.

When the machine tool 1 is used as a lathe, the tool spindle 15 and the tool 2 do not rotate, but the workpiece 3 rotates and is turned by the tool 2.

When the machine tool 1 is used as a machining center, the tool 2 is rotated by the tool spindle 15 to cut the workpiece 3. At this time, the tool rest 14 functions as a spindle head of the machining center.

The machine tool 1 is controlled by a control apparatus having an NC (Numerical Control) device and a PLC (Programmable Logic Controller). The control apparatus includes a control console 16 disposed in a given position on the machine tool 1.

The machine tool 1 has a plurality of changing positions Px. The changing unit 13 is movable between a magazine position Pm and the changing positions Px for transferring the tool 2. When the changing unit 13 is in one of the changing positions Px, the changing unit 13 changes the tool 2 on the tool spindle 15. When the changing unit 13 is in the magazine position Pm, the changing unit 13 changes the tool 2 on the magazine 12.

The changing positions Px include a first changing position P1, a second changing position P2 and a third changing position P3.

The ATC 10 changes the tools as follows: One (e.g., the first changing position P1) of the changing positions Px is selected in advance for changing the tools next time. The changing position (e.g., the first changing position P1) which is selected is closest to either the position of the tool 2 which is presently machining the workpiece 3, or the position of the tool 2 which is scheduled to machine the workpiece 3 next time.

Then, the changing unit 13 and the tool 2, mounted on the tool spindle 15, move to the selected changing position (e.g., the first changing position P1) for changing the tools 2 in the selected changing position. When the changing unit 13 and the tool 2 mounted on the tool spindle 15 reach the selected changing position, the changing unit 13 replaces the tool 2 with another tool. As a result, the distances which the changing unit 13 and the tool spindle 15 move for changing the tools are reduced, and hence the changing unit 13 replaces the tool 2 with another tool in a reduced period of time. The non-machining time of the machine tool 1 is thus shortened.

The machine body 11 includes a bed 17 disposed on the floor and a pair of columns 18 vertically mounted on the floor.

The columns 18 are horizontally spaced from other and disposed on respective longitudinal ends of the bed 17. The bed 17 and the columns 18 jointly provide a base of the machine body 11. The machine body 11 also includes a beam 19 extending horizontally between and supported by the columns 18.

The columns 18 and the beam 19 jointly provide a double-column frame which extends horizontally. The machine tool 1 has an X-axis, a Y-axis and a Z-axis which extend along vertical, transverse, and longitudinal directions, respectively, of the machine tool 1. A cross slide 20 comprises a pair of horizontally spaced vertical members 21, an upper lateral member (not shown) and a lower lateral member 22 which are joined together into a rectangular frame. The cross slide 20 is horizontally movable along the Z-axis. The cross slide 20 has lower and upper ends movably supported respectively by the bed 17 and the beam 19.

A saddle 23 is movably supported on the cross slide 20 for vertical movement along the X-axis. The tool rest 14 is mounted on a front surface of the saddle 23. The tool 2 is detachably mounted on the tool spindle 15 of the tool rest 14.

While the machine tool 1 operates in the turning process, the tool 2 is supported to be nonrotatable on the tool rest 14. While the machine tool 1 operates in the cutting process, the tool 2 is rotated by the tool rest 14. The tool rest 14 is angularly movable about a central axis CL1 oriented along the Y-axis in the direction indicated by the arrow B, and can also be indexed to a desired angular position.

The tool rest 14 has a clamping and unclamping mechanism (not shown) for selectively clamping and unclamping the tool 2 mounted on the tool spindle 15.

The machine body 11 supports thereon Z-axis servomotors 24, 25, Z-axis ball screws 26 and Z-axis guide rails for moving the cross slide 20 along the Z-axis.

The Z-axis ball screws 26 have ends coupled to the Z-axis servomotors 24, 25 and are rotatable about their own axes by the Z-axis servomotors 24, 25. When the Z-axis ball screws 26 are rotated by the Z-axis servomotors 24, 25, the cross slide 20 moves along the Z-axis while being supported and guided by the Z-axis guide rails. The Z-axis servomotors 24 and 25 are reversible motors so that the cross slide 20 can move in one direction and the other along the Z-axis.

The cross slide 20 supports thereon X-axis servomotors 30, X-axis ball screws 31, and X-axis guide rails 32 for moving the saddle 23 along the X-axis. The X-axis ball screws 31 have ends coupled to the X-axis servomotors 30 and are rotatable about their own axes by the X-axis servomotors 30. When the X-axis ball screws 31 are rotated about their own axes by the X-axis servomotors 30, the saddle 23 moves along the X-axis while being supported and guided by the X-axis guide rails 32. The X-axis servomotors 30 are reversible motors so that the saddle 23 can move in one direction and the other along the X-axis.

The chuck 5 is detachably mounted on the distal end of the workpiece spindle 27 which is rotatably supported on the headstock 6. The workpiece 3, which is gripped by the chuck 5, can be rotated by the workpiece spindle 27 about a central axis CL2 oriented along the Z-axis.

For cutting the workpiece 3 with the tool 2 in the form of a rotating tool, the headstock 6 can be controlled to cause the workpiece spindle 27 to index the workpiece 3 to a given angular position.

The machine tool 1 is an elongate machine tool having a horizontally long machining area SP extending along the Z-axis. The machine tool 1 is suitable for machining the workpiece 3 which has a large length in the range from 1,000 mm to 6,000 mm, for example.

For the machine tool 1 to machine the long workpiece 3, the magazine 12 stores a number of tools 2 therein, and the changing unit 13 transfers and changes the tools 2. The machine tool 1 machines the long workpiece 3 with the tool 2.

The machining area SP is covered with a splash guard 40 for preventing the coolant and chips from being scattered out. The splash guard 40 has a plurality of doors 41, 42 and 43 (see FIG. 1) which can be selectively opened and closed.

The splash guard 40 also has a plurality of shutters 44, 45, 46 which can be selectively opened and closed for allowing the changing unit 13 to change the tools. The shutters 44, 45 and 46 are positioned in alignment with the changing positions Px, respectively. In the illustrated embodiment, the shutters 44, 45, 46 comprise a first shutter 44, a second shutter 45 and a third shutter 46 which are disposed respectively in ceiling panels of the doors 41, 42 and 43.

When the shutters 44, 45 and 46 are opened, they create respective openings for the changing unit 13 to move through the opening. When all the shutters 44, 45 and 46 are closed, the machining area SP is fully covered with the splash guard 40.

When all the shutters 44, 45 and 46 are closed, allowing the workpiece 3 to be machined in the machining area SP, the first shutter 44 is disposed immediately above the first changing position P1, the second shutter 45 is disposed immediately above the second changing position P2, and the third shutter 46 is disposed immediately above the third changing position P3.

The changing unit 13 is positioned outside of the splash guard 40 and can move along the Z-axis. The changing unit 13 is controlled to wait in one position of waiting positions (e.g., a first waiting position W1, a second waiting position W2 and a third waiting position W3) immediately above the respective shutters 44, 45 and 46.

The three shutters 44, 45 and 46 are horizontally placed on the ceiling panels of the splash guard 40 along the horizontal direction (Z-axis direction). The changing unit 13, when it is positioned above the ceiling panels of the splash guard 40 of the machine tool 1, can move along the Z-axis over the shutters 44, 45 and 46.

The changing unit 13 can travel shortest linear distances in short times between the magazine 12 and the changing positions P1, P2 and P3. The changing unit 13 is moved by a traveling mechanism 50 extending linearly along the Z-axis on the upper end of the machine body 11. The linear traveling mechanism 50 is relatively simple in structure. The shutters may be provided on rear panels of the splash guard.

Figure 18:
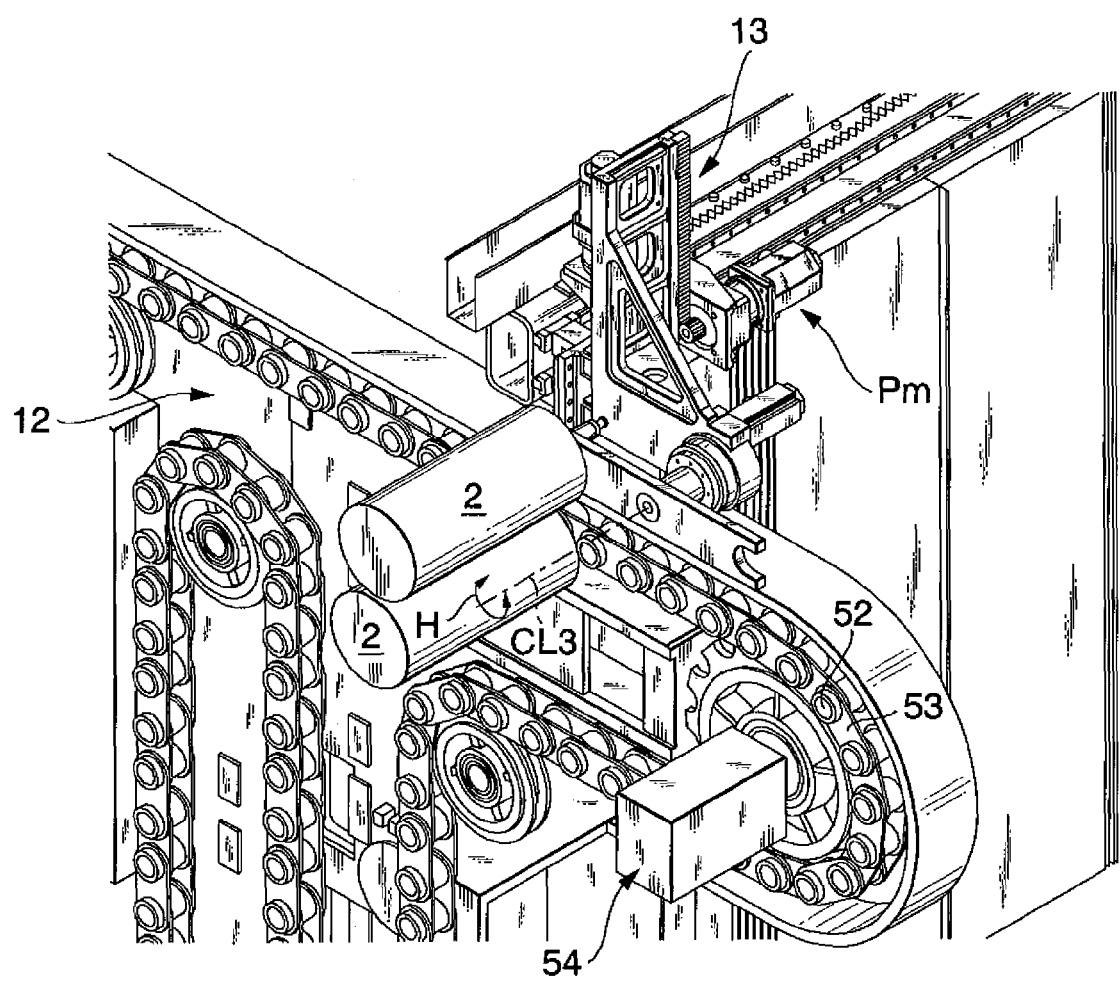
Figure 19:
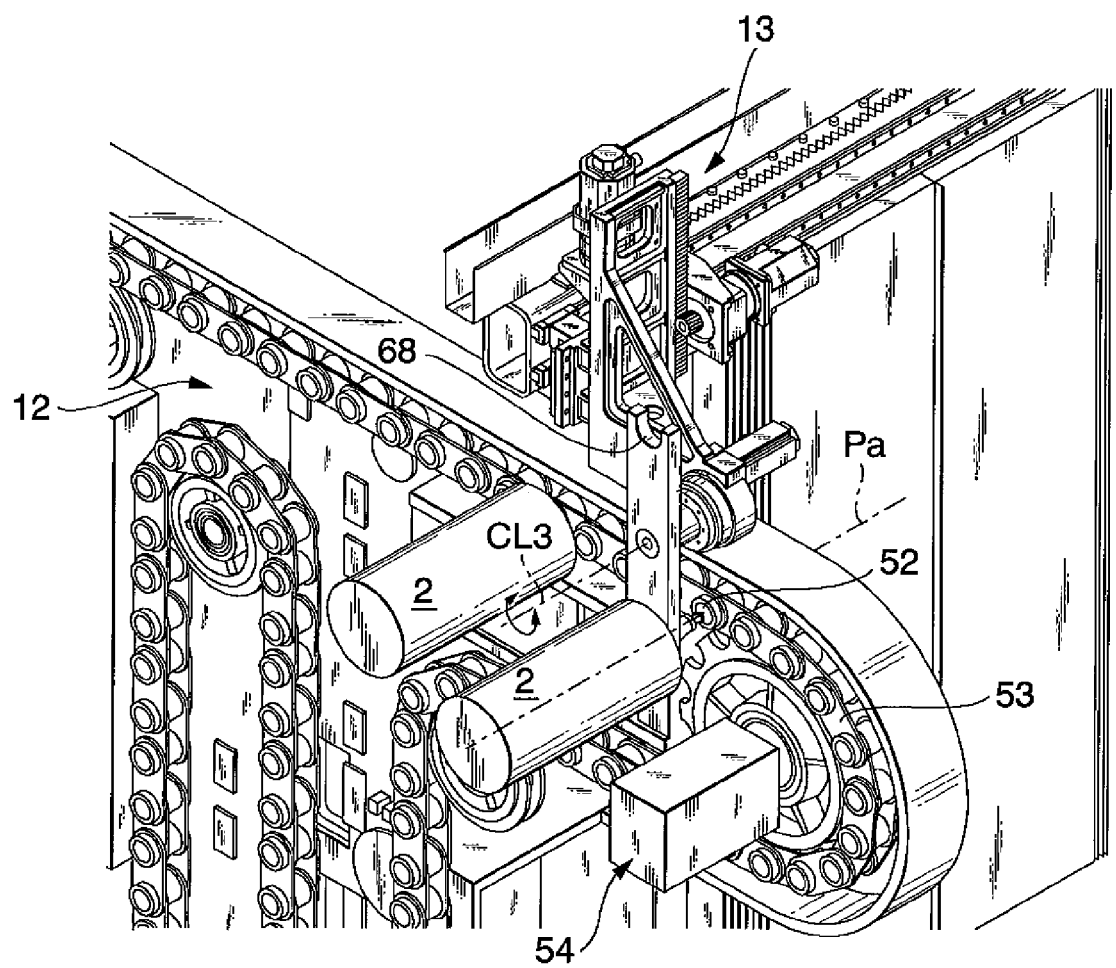

As shown in FIGS. 1, 18 and 19, the magazine 12 for storing a plurality of tools 2 is attached to the machine body 11. The magazine 12 is located in a position outside of the splash guard 40 at a left end of the machine body 11.

The magazine 12 comprises a plurality of tool storage holders 52 and a plurality of link plates 53. The tool storage holders 52 hold the tools 2 removably thereon. The tool storage holders 52 and the link plates 53 are endlessly joined together, and are actuated by a magazine actuator 54 to move along a tortuous path while traveling around sprockets which are rotatable clockwise and counterclockwise.

The magazine 12 operates to deliver the tool storage holder 52 storing a desired tool 2 (e.g., an unused tool 2) or an idle tool storage holder 52 for receiving a used tool 2, to a magazine-side tool changing position Pa.

The magazine 12 is disposed independently of the machine body 11, and does not move along the Z-axis. The magazine 12 is thus capable of many tools 2.

The magazine 12 may have a storage capacity large enough to store 100 to 400 tools 2. According to the machine tool 1, it is capable of machining the elongate workpiece 3 with a number of tools 2.

If the workpiece 3 is a turbine shaft made of a hard material, then the tool 2 which is used to machine the workpiece 3 tends to wear quickly. Therefore, the magazine 12 needs to store many tools 2 of the same kind, and the magazine 12 needs to successively supply the tools 2 to replace the used tool 2 with unused tools 2. The magazine 12 which stores many tools 2 is effective to handle such a situation.

The elongate workpiece 3 referred to above is often bored by the boring bar 4 shown in FIG. 4. In the boring process, the ATC 10 replaces the boring bar 4 on the tool rest 14 with a new boring bar 4. A boring bar 4 which is longer than other boring bars is referred to as a long boring bar.

A certain boring bar 4 has a cutter (tip) 2a on its distal end which is replaceable with another cutter (tip) 2a. If such a boring bar 4 is used, then the ATC 10 replaces the cutter 2a of the boring bar 4 mounted on the tool spindle 15 of the tool rest 4 with another cutter 2a.

When only the cutter 2a of the boring bar 4 is to be replaced with another cutter 2a by the changing unit 13, the control apparatus outputs a tool change start signal. The tool rest 14 then moves to cause the cutter 2a to reach to a selected one, of the first changing position P1, the second changing position P2 and the third changing position P3, which is immediately below the corresponding one of the first shutter 44, the second shutter 45 and the third shutter 46.

The changing unit 13, which has waited in one of the waiting positions, also is controlled to move to the selected changing position. The changing unit 13 then is controlled to replace the cutter 2a, of the boring cutter 4 mounted on the tool spindle 15, with a new cutter 2a. Consequently, the ATC 10 can replace the cutter 2a mounted on the distal end of the boring bar 4, as well as the tool 2 which is directly mounted on the tool spindle 15.

According to the present invention, the machine tool 1 is capable of replacing the cutter 2a mounted on the distal end of the boring bar 4, as well as the tool 2 which is directly mounted on the tool spindle 15, in addition to offering the advantages described above. Furthermore, the machine tool 1 is capable of replacing the cutter 2a on the boring bar 4 without being limited by the size and length of the boring bar 4.

As shown in FIGS. 1 through 8, when the ATC 10 is to change the tools, it selects one of the changing positions Px, which include the first changing position P1, the second changing position P2 and the third changing position P3, as a changing position (e.g., the third changing position P3) for changing the tools next time. The third changing position P3 is selected because it may be closest to the position where the tool 2 on the tool spindle 15 is presently machining the workpiece 3.

Then, the changing unit 13 waits in a waiting position (i.e., the third waiting position W3) which is close to the selected changing position (i.e., the third changing position P3).

Thereafter, the control apparatus outputs the tool change start signal and the tool rest 14 moves to displace the tool 2 thereon to the selected changing position (i.e., the third changing position P3). In this manner, both the changing unit 13 and the tool 2 mounted on the tool spindle 15 move to the selected changing position (i.e., the third changing position P3). Thereafter, the changing unit 13 replaces the tool 2 mounted on the tool spindle 15 with a new tool 2 in the selected changing position (i.e., the third changing position P3).

As a result, the distances which the changing unit 13 and the tool spindle 15 move for changing the tools are reduced, and hence the changing unit 13 replaces the tool 2 with another tool 2 in a reduced period of time. The non-machining time of the machine tool 1 is thus shortened.

The traveling mechanism 50 extending linearly along the Z-axis is disposed on the upper end of the machine body 11 behind the machining area SP. The linear traveling mechanism 50 serves to move the changing unit 13 along the Z-axis.

The traveling mechanism 50 comprises a pair of guide rails 60, extending along the Z-axis and spaced vertically from each other, and a rack 61 disposed along guide rails 60 parallel thereto and extending along the Z-axis.

The changing unit 13 comprises a unit frame 62, a reciprocally movable member 63 and an arm 64.

The unit frame 62 is supported and guided by the traveling mechanism 50 (i.e., the guide rails 60) and is movable in displacing directions along the guide rails 60 (i.e., the Z-axis) by a linearly driving servomotor 65. The servomotor 65 is mounted on the unit frame 62 and has a drive shaft oriented downwardly.

The reciprocally movable member 63 is supported on the unit frame 62. The reciprocally movable member 63 is reciprocally movable in first directions (i.e., vertically along the X-axis) perpendicular to the moving directions by a reciprocally driving servomotor 66. The servomotor 66 is mounted on the unit frame 62 and has a drive shaft oriented horizontally to the left.

The arm 64 has at least two tool grippers 68 (two tool grippers 68 in the present embodiment) for detachably gripping the tool 2. The arm 64 is rotatably mounted on the reciprocally movable member 63 and is actuated by a swiveling servomotor 67 to swivel around a central axis CL3.

When the swiveling servomotor 67 is energized, the arm 64 swivels about the central axis CL3 in the direction indicated by the arrow H until it is oriented in a desired direction. The swiveling servomotor 67 may be energized to index an unused tool 2 gripped by one of the tool grippers 68 to a given angular position or to index one of the tool grippers 68 which carries no tool to a given angular position.

When the linearly driving servomotor 65 is energized to move the changing unit 13 as a whole in one of the directions indicated by the arrow D, the arm 64 is also moved in a direction along the central axis CL3.

When the arm 64 is thus swiveled about the central axis CL3 and is moved back and forth along the central axis CL3, the arm 64 can install an unused tool 2 on the tool spindle 15 or remove a used tool 2 from the tool spindle 15.

The changing unit 13 can change the tools on the tool spindle 15 in a changing position which is selected from the changing positions Px.

The changing unit 13 can also directly change the tools on the magazine 12 in the magazine position Pm. Accordingly, the ATC 10 is of a relatively simple structure as it does not have a tool feeder which has heretofore been provided between the magazine and a tool changing arm.

The linearly driving servomotor 65 on the unit frame 62 has a pinion, not shown, on its drive shaft which is held in driving mesh with the rack 61. When the linearly driving servomotor 65 is energized, the changing unit 13 moves along the Z-axis in one of the directions indicated by the arrow D by the pinion and the rack 61.

The reciprocally driving servomotor 66 is mounted on the unit frame 62 with its drive shaft extending horizontally. A vertical rack 75 is mounted on the reciprocally movable member 63. The reciprocally driving servomotor 66 has a pinion 76 on its drive shaft which is held in driving mesh with the rack 75.

The reciprocally movable member 63 has a frame supported and guided by the unit frame 62 for movement along the X-axis in the directions indicated by the arrow G. When the reciprocally driving servomotor 66 is energized, the reciprocally movable member 63 is vertically moved along the X-axis in one of the directions indicated by the arrow G by the pinion 76 and the rack 75.

The swiveling servomotor 67 is mounted on the reciprocally movable member 63 with its drive shaft oriented horizontally along the Z-axis. The drive shaft of the swiveling servomotor 67 extends toward the magazine 12 (to the left in FIG. 3). The swiveling servomotor 67 can index the arm 64 to a desired angular position through a speed reducer mechanism 69.

The changing unit 13 transfers the tool 2 by traveling between the magazine position Pm and a selected one of the plural changing positions Px.

The changing unit 13 changes the tools on the tool spindle 15 in the first changing position P1, the second changing position P2 or the third changing position P3. The changing unit 13 also changes the tools on the magazine 12 in the magazine position Pm.

The changing unit 13 which is constructed as described above is simpler in structure and lighter in weight than conventional automatic tool changers.

A process of changing the tools 2 with the ATC 10 will be described below with reference to FIGS. 1, 3, 6 through 19.

Figure 8:
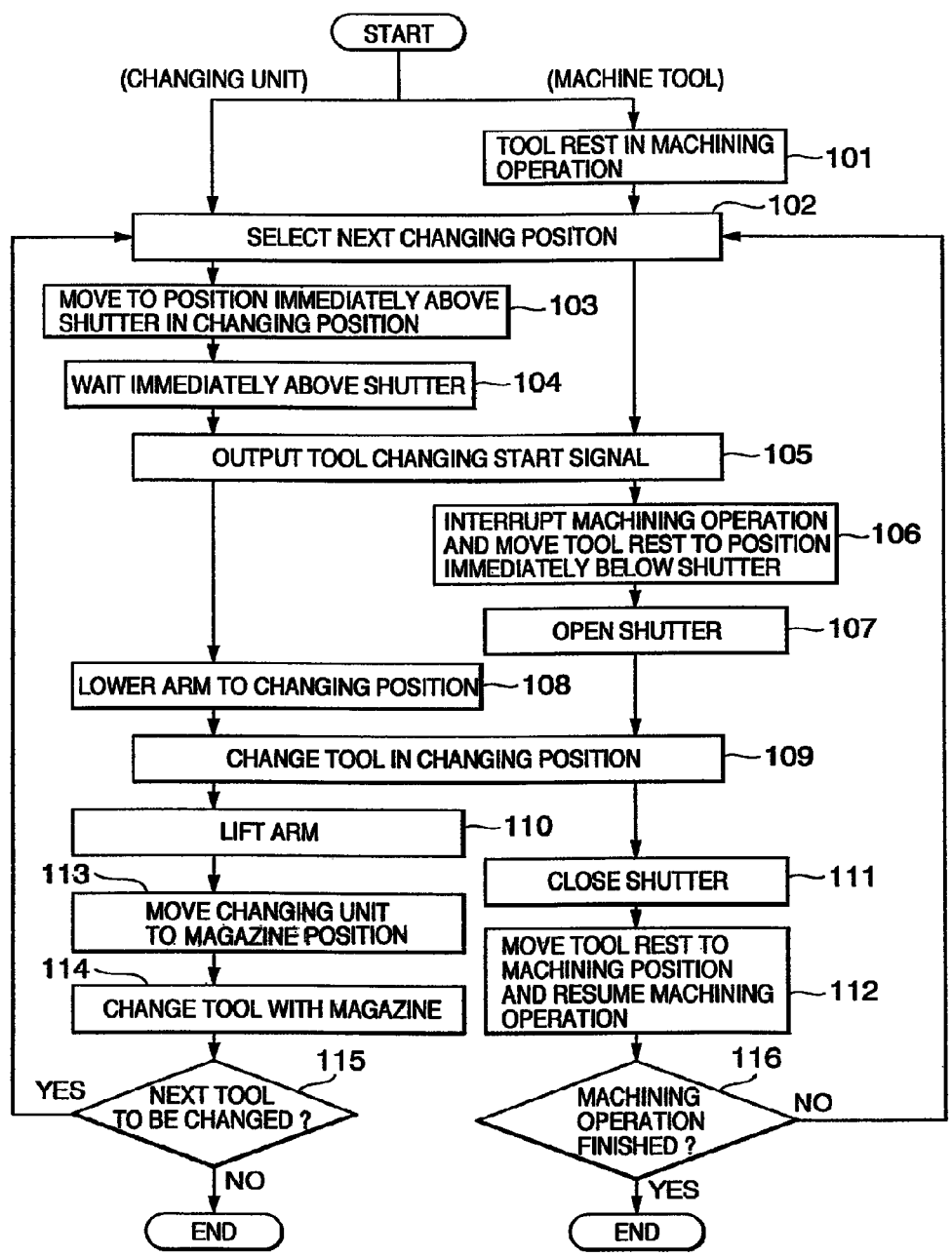
FIG. 8 is a flowchart of an operation sequence of a tool changing cycle.
Figure 9:
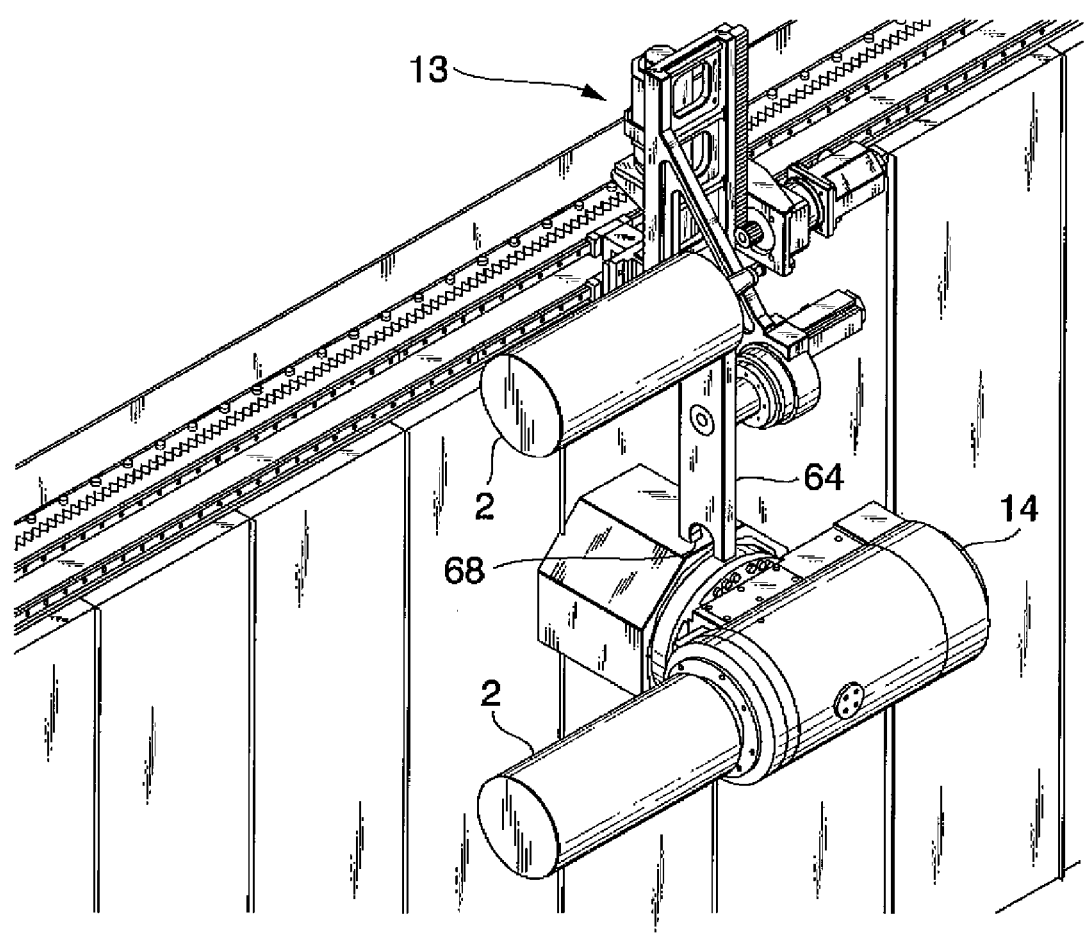
FIGS. 9 through 19 are fragmentary perspective views illustrating an operational facet of a tool changing unit.

FIG. 8 is a flowchart of an operation sequence of a tool changing cycle. FIGS. 9 through 19 are fragmentary perspective views illustrating respective operational facets of the changing unit 13.

It is assumed that the workpiece 3 gripped by the chuck 5 of the headstock 6 is being machined by the tool 2 mounted on the tool rest 14 (step 101, FIG. 7A).

The control apparatus outputs a command signal to start the tool changing cycle. One of the three changing positions (i.e., the first changing position P1, the second changing position P2 and the third changing position P3) is selected in advance as a changing position for changing the tools next time, while the workpiece 3 is being machined by the tool 2 mounted on the tool rest 14 (step 102). At this time, the control apparatus selects one position of the three changing positions which is closest to the tool 2 on the tool rest 14 which is presently machining the workpiece 3.

The changing unit 13 moves to one of the three waiting positions (i.e., the first waiting position W1, the second waiting position W2 and the third waiting position W3) immediately above the shutter (i.e., the first shutter 44, the second shutter 45 or the third shutter 46) disposed above the selected changing position (step 103).

The changing unit 13 then waits in the waiting position above the shutter (step 104). In FIG. 6, the changing unit 13 is waiting with the arm 64 oriented horizontally.

In FIG. 7B, the changing unit 13 is waiting in the first waiting position W1 immediately above the first shutter 44 for changing the tools in the first changing position P1. In FIG. 7C, the changing unit 13 is waiting in the second waiting position W2 immediately above the second shutter 45 for changing the tools in the second changing position P2. In FIG. 7D, the changing unit 13 is waiting in the third waiting position W3 immediately above the third shutter 46 for changing the tools in the third changing position P3.

While the workpiece 3 is being machined by the tool 2 on the tool rest 14, the ATC 10 decides to replace the tool 2, which has been used, with another unused tool 2. The control apparatus outputs a tool change start signal (step 105).

The tool rest 14 then interrupts the machining operation and moves to the changing position (i.e., to the position immediately below the shutter) closest to the machining position as indicated by the arrow K (step 106, FIGS. 7B through 7D). At this time, the tool rest 14 should preferably move a shortest distance along an upward oblique path.

At the same time that or after, the tool rest 14 is moved, the shutter is opened to provide a shutter opening in the splash guard 40 (step 107).

The arm 64 of the changing unit 13 is swiveled to orient an idle tool gripper 68 downwardly (FIG. 9) and the other tool gripper 68 carrying an unused tool 2 upwardly. Then, the arm 64 is lowered through the shutter opening to the changing position below (step 108).

Figure 10:
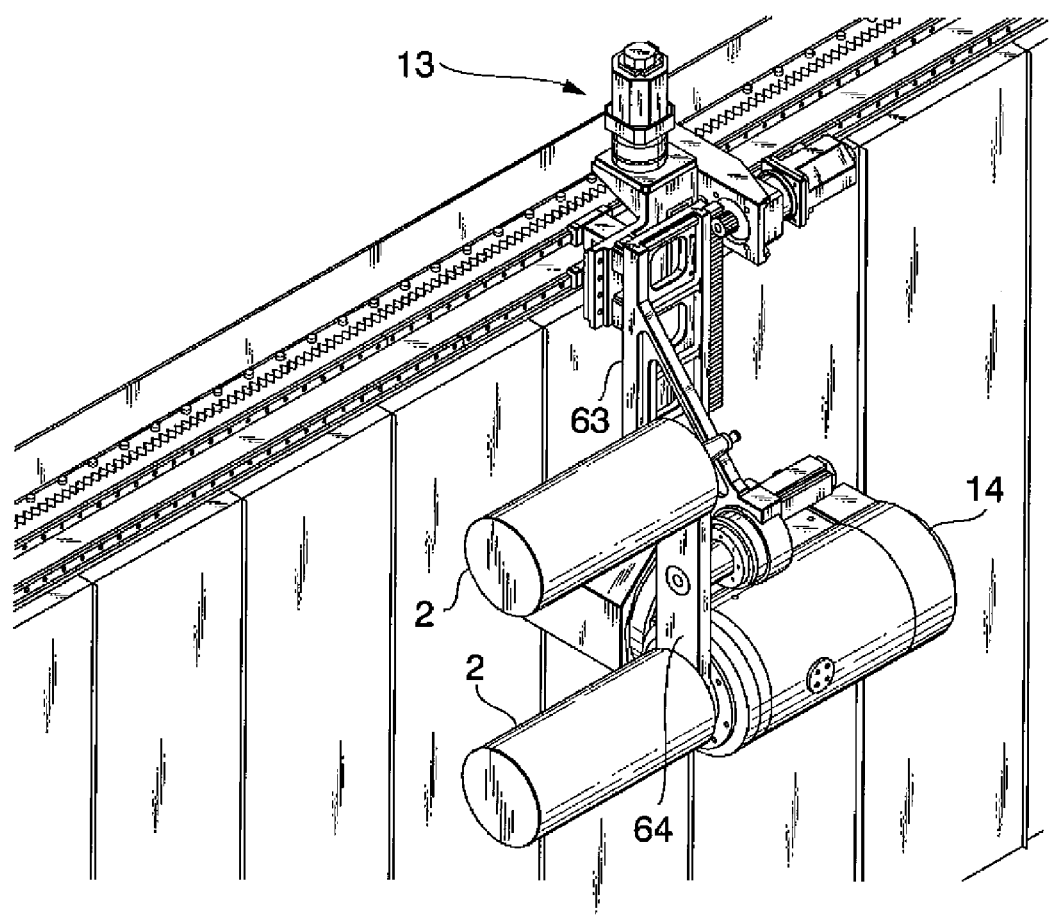

After the arm 64 is lowered, the tool 2 on the tool rest 14 is replaced in the changing position (step 109). Specifically, after the arm 64 is lowered, the lower idle tool gripper 68 grips the used tool 2 mounted on the tool rest 14 (FIG. 10). The clamping and unclamping mechanism of the tool rest 14 is operated to unclamp the used tool 2 off the tool rest 14.

Figure 11:
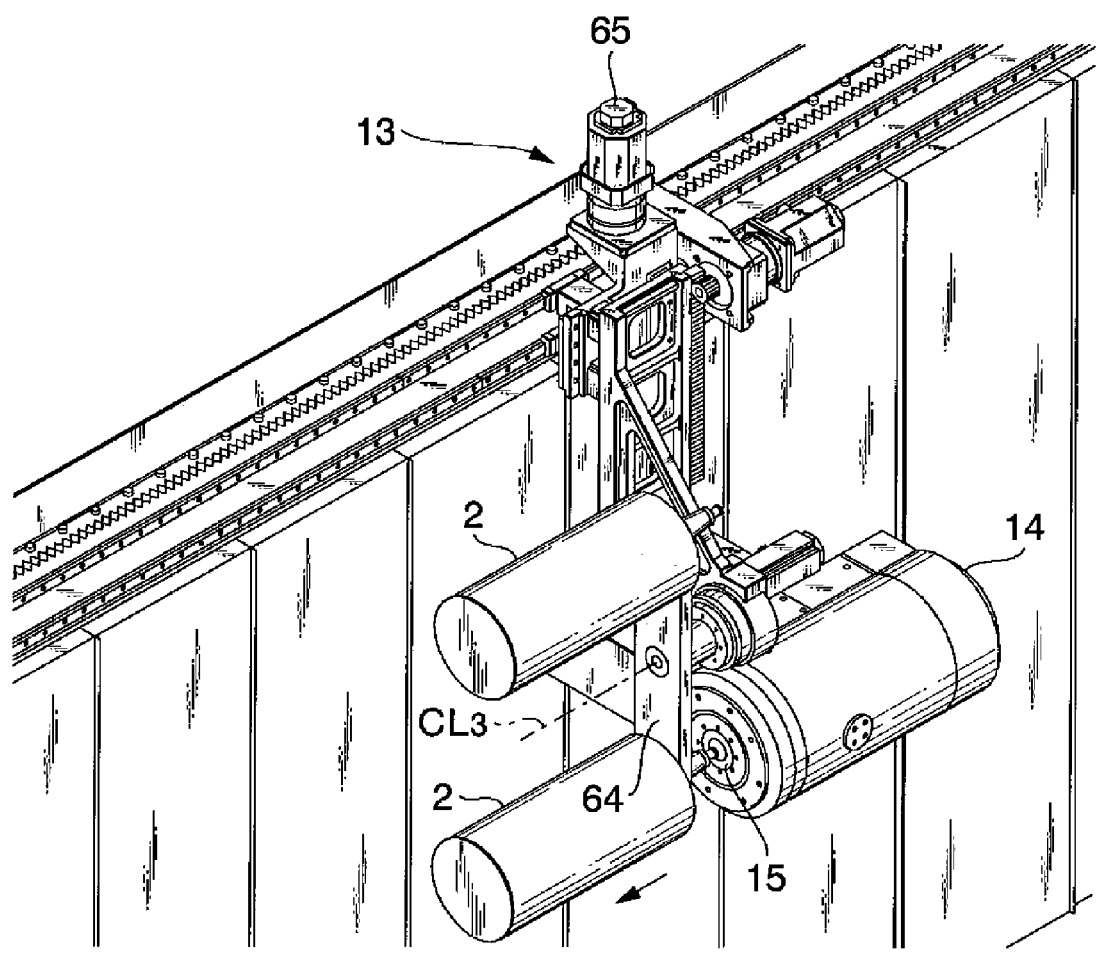

Then, the linearly driving servomotor 65 of the changing unit 13 is energized to move the changing unit 13 as a whole slightly to the left. The arm 64 is retracted along the central axis CL3 from the tool rest 14, pulling the used tool 2 from the tool rest 14 (FIG. 11).

Figure 12:
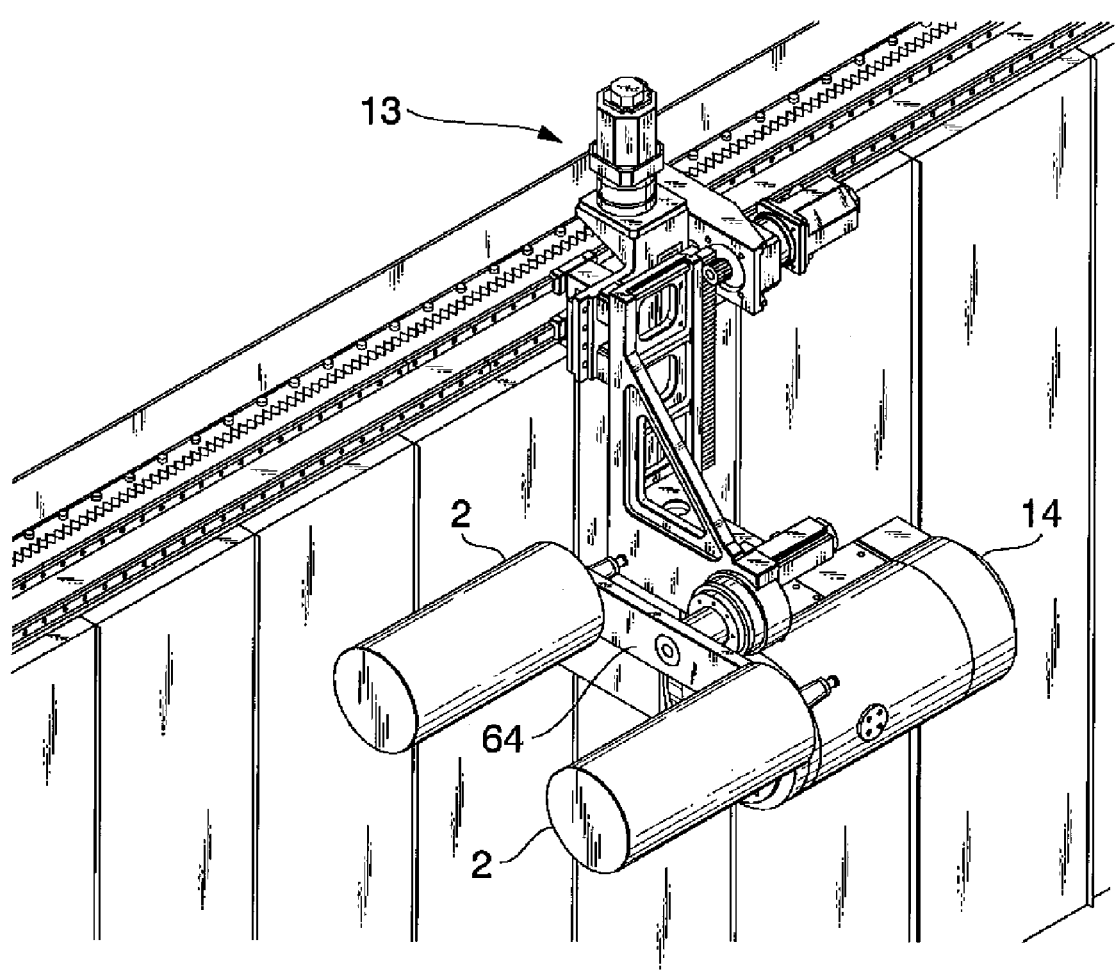
Figure 13:
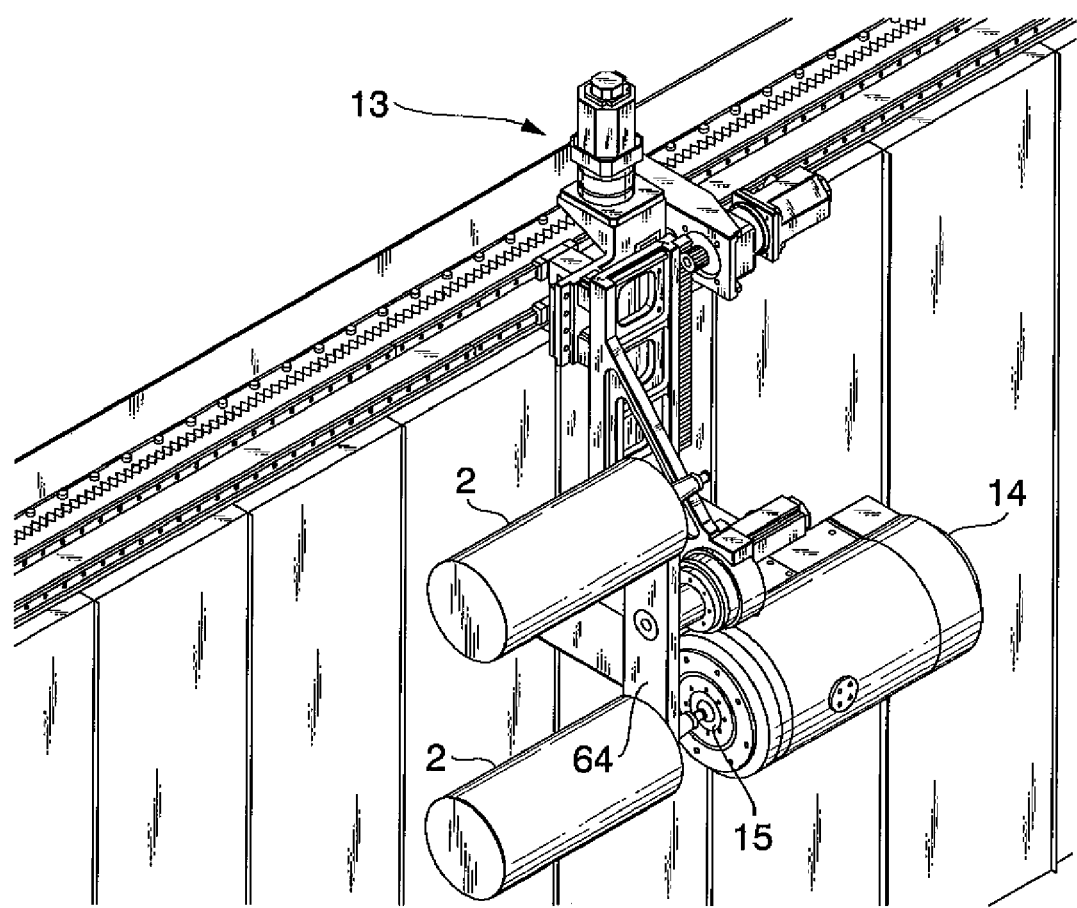

Then, the arm 64 is swiveled 180° to bring the used tool 2 into an upper position and to bring the unused tool 2 into a lower position, respectively (FIGS. 12 and 13).

Figure 14:
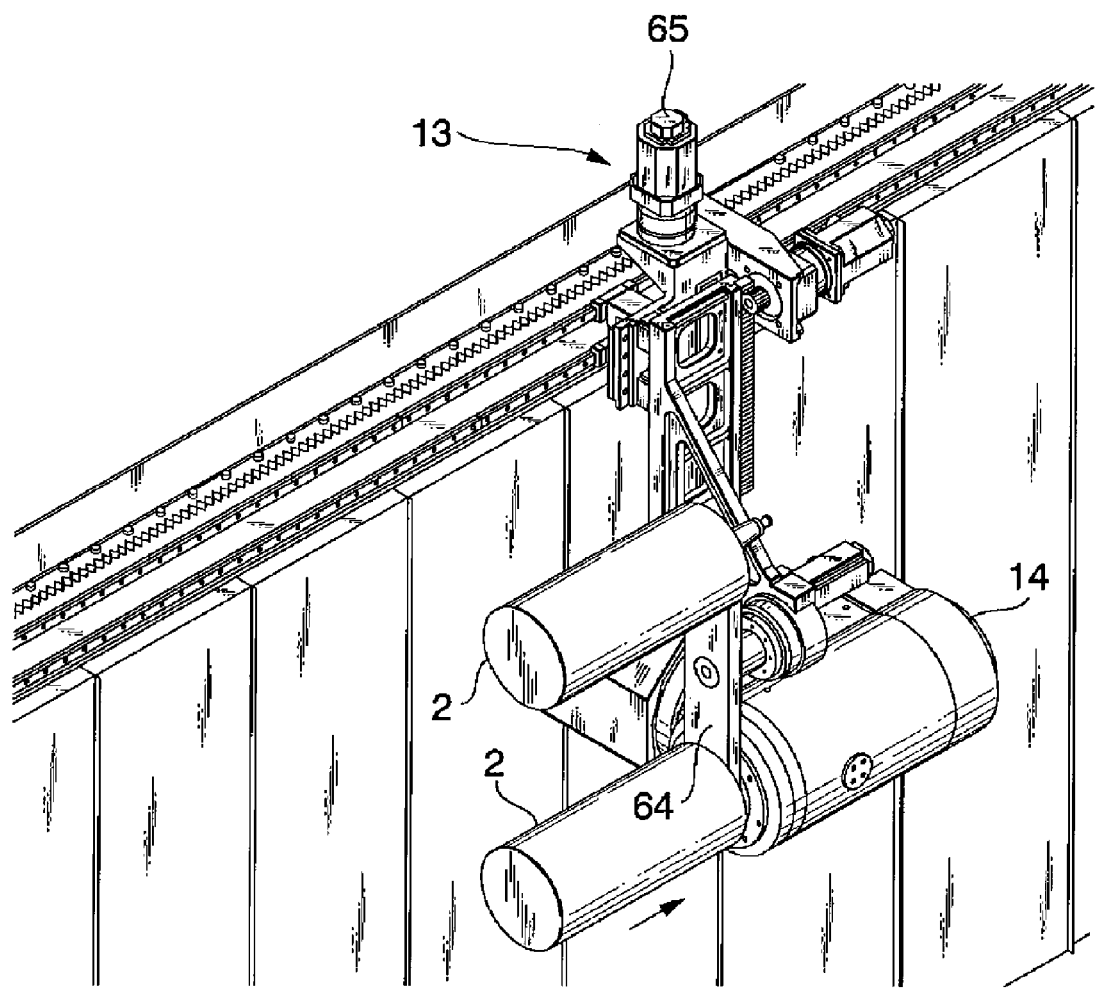

Then, the linearly driving servomotor 65 is energized to move the changing unit 13 as a whole slightly to the right. The unused tool 2 gripped by the lower tool gripper 68 of the arm 64 is now mounted on the tool spindle 15 of the tool rest 14 (FIG. 14). The clamping and unclamping mechanism of the tool rest 14 is operated to clamp the unused tool 2 on the tool spindle 15 of the tool rest 14.

Figure 15:
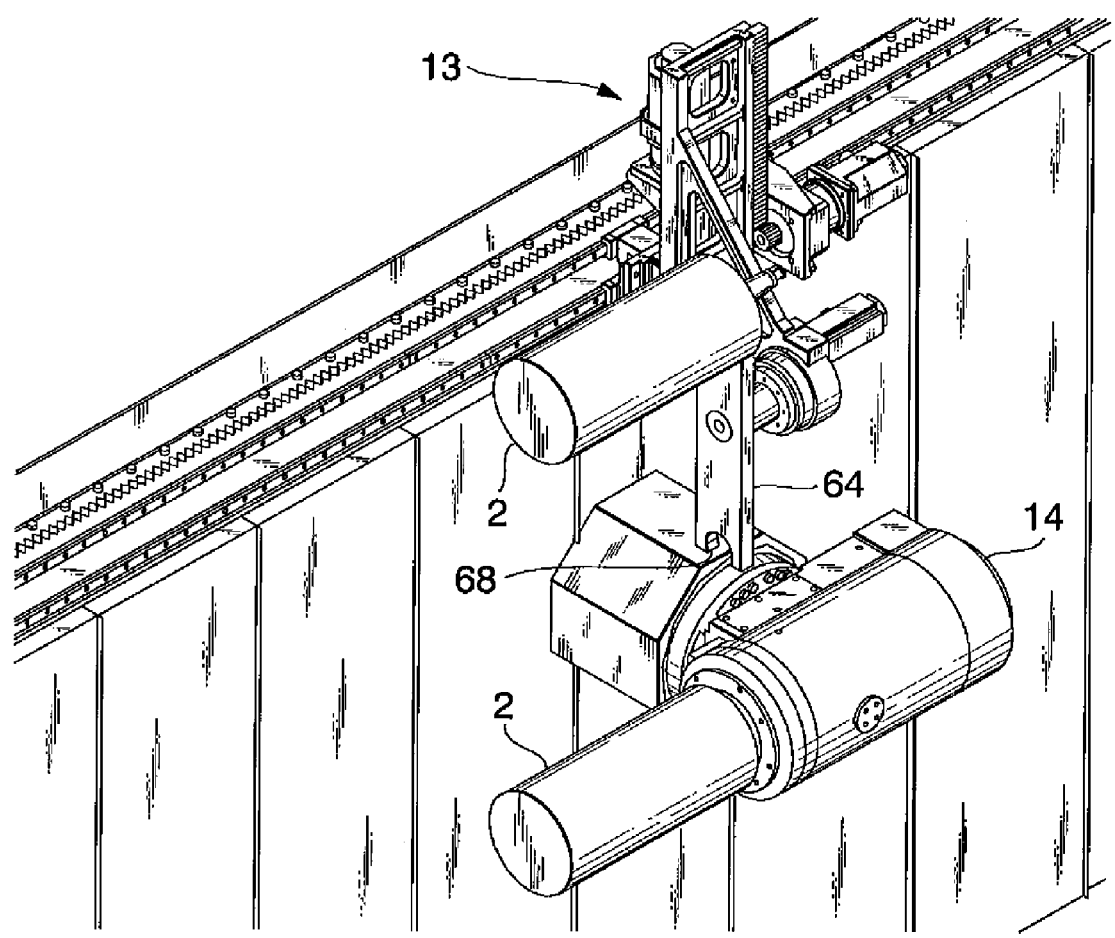
Figure 16:
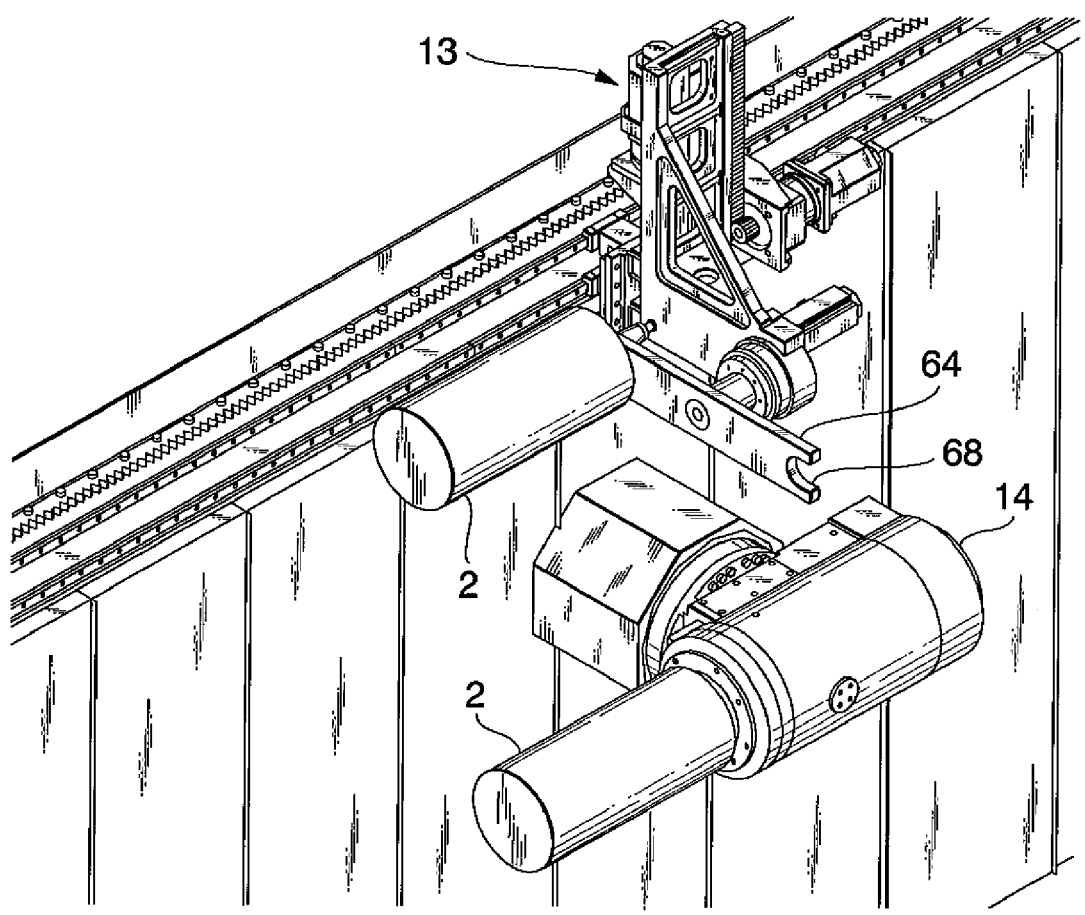

After the tools 2 are changed, the arm 64 is elevated (step 110, FIG. 15). The shutter is then closed, closing the machining area SP (step 111). Thereafter, the tool rest 14 returns to the machining position, and resumes machining the workpiece 3 with the new tool 2 (step 112).

Figure 17:
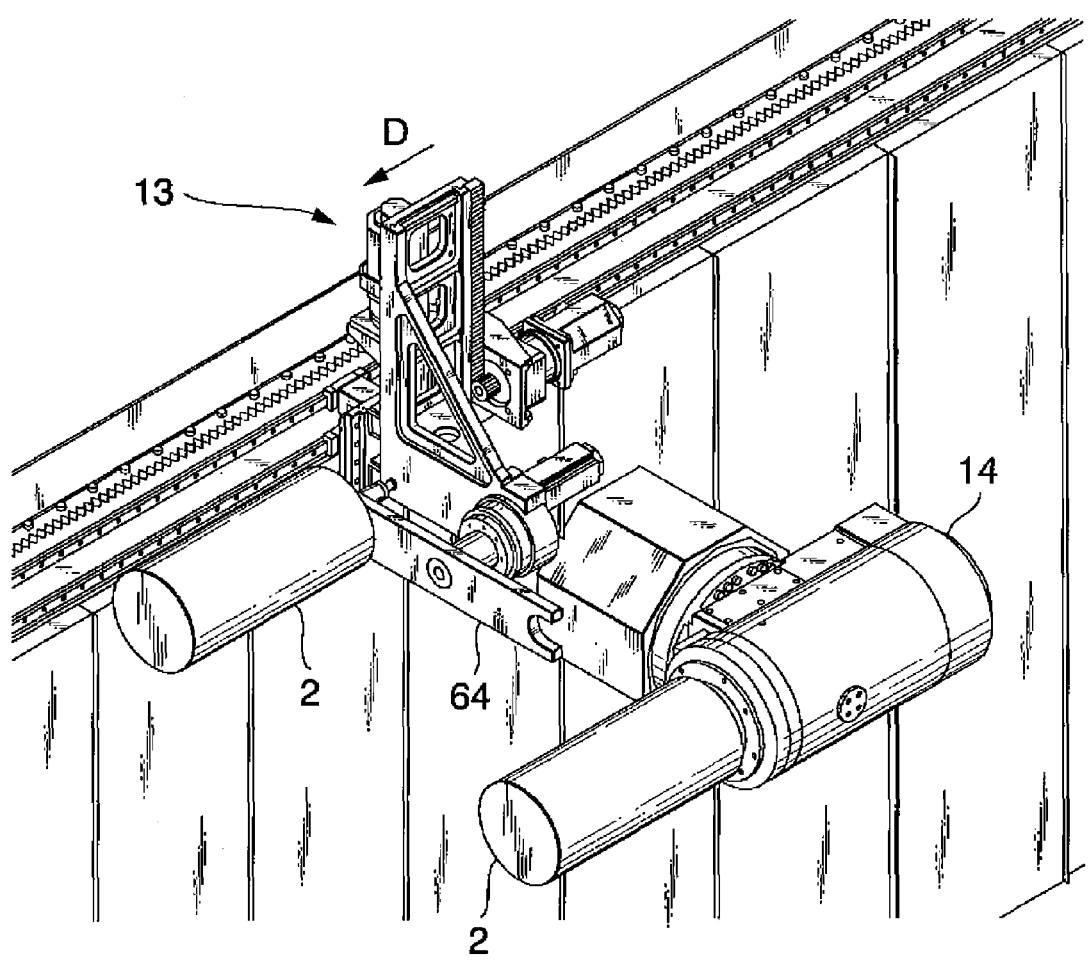

The arm 64 is swiveled into a horizontal position (FIG. 16), and then the changing unit 13 moves from the changing position to the magazine position Pm in the direction indicated by the arrow D (step 113, FIG. 17). After the changing unit 13 reaches the magazine position Pm (FIG. 18), the arm 64 changes the tools on the magazine 12 (step 114, FIG. 19).

Specifically, the changing unit 13 swivels the arm 64 about the central axis CL3 and moves the arm 64 along the central axis CL3. The magazine 12 indexes the tool storage holder 52, which is storing a desired unused tool 2, or an idle tool storage holder 52 for receiving the used tool 2 to the magazine-side tool changing position Pa.

Specifically, in the magazine-side tool changing position Pa, the used tool 2 gripped by the tool gripper 68 of the arm 64 is stored on the idle tool storage holder 52. Thereafter, the unused tool 2 on the tool storage holder 52 is indexed to the magazine-side tool changing position Pa. In the magazine-side tool changing position Pa, the unused tool 2 on the tool storage holder 52 is gripped by the idle tool gripper 68 of the arm 64.

After the tools 2 are changed on the magazine 12 (step 114), the control apparatus determines whether a next tool changing cycle is to be carried out or not (step 115). If the next tool changing cycle is to be carried out, then control goes back to step 102. If the next tool changing cycle is not to be carried out, then the process of changing the tools is ended.

After the new tool 2 on the tool rest 14 has resumed machining the workpiece 3 (step 112), the control apparatus determines whether the machining process is finished or not (step 116). If the machining process is not finished, then control goes back to step 102. If the machining process is finished, then the process of changing the tools is ended.

As described above, both the changing unit 13 of the ATC 10 and the tool 2 mounted on the tool spindle 15 move to the changing position to change the tools. The ATC 10 has a plurality of changing positions (three changing positions in the illustrated embodiment) for changing the tools on the tool spindle 15.

The changing unit 13 moves to the waiting position, which is close to the selected changing position, and waits in the waiting position. After the tool change start signal is output, therefore, the changing unit 13 and the tool spindle 15 are only required to move respective short distances up to the changing position.

The illustrated machine tool 1 has the horizontally long machining area SP. Heretofore, the tool rest 14 has to move a long distance for changing the tools because of the horizontally long machining area SP.

According to the present embodiment, even though the machine tool 1 has the horizontally long machining area SP, the tool rest 14 only needs to move to the changing position closest to the machining position for changing the tools. Therefore, the distance that the tool rest 14 has to move may be short.

As the changing unit 13 is of a simple structure, the servomotors 65, 66, 67 and their drive force transmitting mechanisms may be relatively small in size. Consequently, the changing unit 13 may be relatively small in weight as a whole. As a result, the changing unit 13 can move and operate at a high speed, and the arm 64 can swivel at a high speed.

The time required to change the tools on the tool spindle 15 is reduced, thus reducing the non-machining time of the machine tool 1. The ATC 10 as it is combined with the elongate machine tool 1 having the horizontally long machining area SP is highly advantageous in that it can greatly shorten the non-machining time of the machine tool 1.

The ATC 10 according to the present embodiment was compared with an ATC according to the related art which is combined with an elongate machine tool having the same horizontally long machining area SP.

The ATC according to the related art consumed 6.7 seconds for changing the tools when the tool rest 14 was machining the workpiece at a position closest to the changing position. However, when the tool rest 14 was machining the workpiece at a position remotest from the changing position, the ATC according to the related art consumed 27.3 seconds for changing the tools.

It was confirmed that the ATC 10 according to the present embodiment was capable of changing the tools in about 10 seconds at all times when the tool rest 14 was machining the workpiece at any position. In the ATC 10 according to the present embodiment, the changing unit 13 moved horizontally at a speed of 70 m/min. along the Z-axis and moved vertically at a speed of 40 m/min. along the X-axis.

The changing unit 13 is disposed outside of the splash guard 40 while it is not changing the tools. Therefore, when the changing unit 13 moves along the Z-axis, it does not interfere or contact with the tool rest 14. Except when the changing unit 13 is changing the tools on the tool spindle 15, the coolant and the chips are prevented by the splash guard 40 from being applied to and contaminating the changing unit 13. As a result, the changing unit 13 can change the tools highly accurately.

The ATC according to the present invention is applicable to a lathe, a machining center, a turning center or a grinding machine, as well as a multi-axis turning center.

Although a certain preferred embodiment of the present invention has been shown and described in detail, it should be understood that various changes and modifications may be made therein without departing from the scope of the appended claims.

What is claimed is:

1. A machine tool comprising an automatic tool changer having a movable tool changing unit for changing tools, a tool magazine for storing a plurality of tools, and a tool spindle for mounting a tool thereon and for machining a workpiece with the mounted tool in a machining area of the machine tool;
    wherein said tool changing unit moves between a magazine position and a changing position to transfer the tool, changes the tool on said tool spindle in said changing position, and changes the tools on said tool magazine in said magazine position,
    wherein said machine tool has a plurality of the changing positions;
    one of said changing positions is selected in advance of the changing of the tool on said tool spindle for changing the tool on said tool spindle;
    said tool changing unit and the tool mounted on said tool spindle move to the selected changing position for changing the tools between the tool changing unit and the tool spindle in the selected changing position; and
    wherein the machining area is covered with a splash guard having a plurality of shutters located in positions corresponding to the changing positions, respectively, which shutters are each configured to be selectively opened and closed to permit the passage of the tool changing unit from outside the splash guard to the machining area to perform a tool change between the tool changing unit and the tool spindle at the respective changing position.

2. A machine tool according to claim 1,
    wherein the machining area of the machine tool is a long machining area which is elongate in a horizontal direction; and
    said tool changing unit is disposed outside of said splash guard and is movable in said horizontal direction and is capable of waiting selectively in waiting positions near said shutters, respectively.

3. A machine tool according to claim 2,
    wherein said shutters are placed on a ceiling panel of said splash guard spaced along said horizontal direction; and
    said tool changing unit is movable above the ceiling panel of said splash guard in said horizontal direction along said shutters.

4. A machine tool according to claim 1, wherein said tool changing unit comprises:
    a unit frame supported and guided by a traveling mechanism and actuated by a linearly driving servomotor to move in a displacing direction;
    a reciprocally movable member supported on said unit frame and actuated by a reciprocally driving servomotor to move reciprocally in a first direction perpendicular to said displacing direction; and
    an arm mounted on said reciprocally movable member and actuated to be swiveled by a swiveling servomotor, said arm having at least two tool grippers each for detachably gripping a respective tool.

5. A machine tool according to claim 1,
wherein said machine tool is capable of machining said workpiece which is elongate; and
when said elongate workpiece is machined with said tool mounted on said tool spindle, said tool changing unit transfers and changes said tool mounted on said tool spindle successively with others of said tools stored in said tool magazine.

6. A machine tool according to claim 1,
wherein said machine tool comprises a multi-axis turning center including a headstock for rotatably supporting a workpiece spindle having a chuck for gripping said workpiece, and a tool rest having said tool spindle.

7. A machine tool according to claim 6,
wherein said tool changed by said tool changing unit comprises a cutter detachably mounted on a distal end of a boring bar mounted on said tool spindle of said tool rest; and
said tool rest moves to cause said cutter to reach to the selected changing position and said tool changing unit is controlled to change said cutter on said boring bar mounted on said tool spindle.

8. A machine tool comprising an automatic tool changer having a movable tool changing unit for changing tools, a tool magazine for storing a plurality of tools, and a tool spindle for mounting a tool thereon and for machining a workpiece with the mounted tool in a machining area of the machine tool;
wherein said tool changing unit moves between a magazine position and a changing position to transfer the tool, changes the tool on said tool spindle in said changing position, and changes the tools on said tool magazine in said magazine position,
wherein said machine tool has a plurality of the changing positions;
one of said changing positions is selected in advance of the changing of the tool on said tool spindle for changing the tool on said tool spindle, and
said tool changing unit is controlled, prior to the changing of the tool on said tool spindle, to wait in one position, of waiting positions, which is close to the selected changing position; and
when a tool change start signal is output, said tool spindle moves to cause said tool mounted thereon to reach the selected changing position, and said tool changing unit moves and changes the tool on said tool spindle in the selected changing position; and
wherein the machining area is covered with a splash guard having a plurality of shutters located in positions corresponding to the changing positions, respectively, which shutters are each configured to be selectively opened and closed to permit the passage of the tool changing unit from outside the splash guard to the machining area to perform the tool change between the tool changing unit and the tool spindle at the respective changing position.

* * * * *